United States Patent [19]

Blount

[11] Patent Number: 5,034,423

[45] Date of Patent: Jul. 23, 1991

[54] INORGANIC - ORGANIC FLAME-RETARDANT POLYOLS

[76] Inventor: David H. Blount, 6728 Del Cerro Blvd., San Diego, Calif. 92120

[21] Appl. No.: 419,513

[22] Filed: Oct. 10, 1989

[51] Int. Cl.⁵ ................................................. C08J 9/14
[52] U.S. Cl. ..................................... 521/107; 521/106; 521/108; 521/168; 521/154; 528/405; 528/409
[58] Field of Search ............... 521/106, 107, 108, 168, 521/154, 156; 528/405, 409

[56] References Cited

U.S. PATENT DOCUMENTS 4,737,575  4/1988  Blount ................................. 521/154
4,859,713  8/1989  Blount ................................. 521/107

Primary Examiner—Morton Foelak
Assistant Examiner—Duc Truong

[57] ABSTRACT

Inorganic organic flame-retardant polyols are produced by mixing and chemically reacting an epoxy compound with a compound containing reative hydrogens and acidic boron compound in the presence of an epoxy catalyst. These polyols may be utilized to produce polyester resinous products, polyamide resinous products and polyurethane solid and foamed products which may be utilized as coating agents, adhesives, sound and thermal insulation and molding agents.

24 Claims, No Drawings

INORGANIC - ORGANIC FLAME-RETARDANT POLYOLS

BACKGROUND OF THE INVENTION

This invention relates to the production of flame-retardant polyols. The inorganic-organic flame-retardant polyols are produced by mixing and reacting an epoxy compound, a compound containing one or more reactive hydrogen atoms that will react with an epoxy compound and an acidic boron compound in the presence of an epoxy catalyst. When this polyol is utilized in the production of polyurethane product the pH may need to be adjusted to where the pH is above 6. A basic salt-forming compound may be used to adjust the pH. When the flame-retardant polyol is to be utilized in the production of flame-retardant polyester polyols a polycarboxylic acid and/or polycarboxylic anhydride is added with the epoxy compound and after the reaction is partically completed further heating is required to complete the esterification.

While not wishing to be bound by any theory of operation, it appears that the acidic boron compound, epoxy compound, reactive hydrogen containing compound and certain epoxy catalyst react to produce an organic-inorganic flame-retardant polyol which may be further reacted with or in the presence of a. basic salt forming compound to adjust the pH when necessary. An excess of the acidic boron compound may be used to further improve the flame-retardant properties. When phosphorus containing compounds are used as the epoxy catalyst further improvement in the flame-retardant properties is seen. The polyol produced may be further heated to esterify boric acid with an organic hydroxyl radical if desired. The low molecular weight polyol or unreacted epoxy compound may be separated by distillation from the higher molecular weight polyols and some of the low molecular weight polyols will also esterify with any free boron acid radicals present in the flame-retardant polyol which also assists in adjusting the pH to above 6.

SUMMARY OF THE INVENTION

Organic-inorganic flame-retardant polyols are produced by mixing and reacting the following components:

Component A: epoxy, in the amount of 50 to 200 parts by weight;
Component B: compound containing 1 or more reactive hydrogen in the amount of up to 100 parts by weight;
Component C: acidic Boron compound, in the amount of 10 to 100 parts by weight;
Component D: epoxy catalyst, a catalytic amount ranging from 0.1 to 20 parts by weight;
Component E: basic salt forming compound that will adjust the pH of the organic-inorganic polyol, in an amount up to 300 parts by weight.

Component A

Any suitable organic epoxide compound may be used in this invention. Suitable organic epoxide compounds include, but are not limited to, olefin oxides such as ethylene oxide, propylene oxide, butylene oxide, trichlorobutylene oxides, etc., styrene oxide, tetrahydrofuran, epihalohydrins such as epichlorohydrin, epibromohydrin, methyl epichlorohydrin, di-epi-iodohydrin, etc., polyepoxy compounds which may be aliphatic or cycloaliphatic and monomeric or polymeric such as vinyl cyclohexane dioxide, 4,4 epoxycyclohexylmethyl -3,4-epoxy cyclohexane carboxylate, 3,4 -epoxy-6-methyl-cyclohexylmethyl adipate, epoxidized vegetable oils, e.g. epoxidized soy bean oil, and the bis-epoxides of polyalkylene ether glycols, and mixtures thereof. It is preferred to use a mono-epoxide compound with the polyepoxy compounds. Propylene oxide is the preferred epoxide compound.

Component B

Any suitable inorganic or organic compound which contains 1 or more reactive hydrogens that will chemically react with an epoxy compound may be used in this invention. Suitable reactive compounds include, but are not limited to water, alcohols, organic polyhydroxyl compounds, amines, ammonia, alcohol amines, amino compounds, polyamides, polyester amides, polyimides, etc.

Compounds which contain 2 or more reactive hydrogen are preferred as the starting component, e.g., water, ethylene glycol, propylene-1,3-or -1,2-glycol, trimethylol propane, glycerol, diethylenetriamine, aromatic diamines, sucrose, sorbitol and the like and further such compounds as containing two or more hydroxyl groups at molecular end.

Any suitable liquid polyol (organic polyhydroxyl compound), in particular, compounds which contain from 2 to 8 hydroxyl groups, especially those with a molecular weight of about 400 to about 6,000, e.g. polyesters, polyethers, polythioethers, polyacetals, polycarbonates or polyester amides containing at least 2, generally form 2 to 8, but preferably dihydric alcohols, with the optional addition of trihydric alcohols, and polybasic, preferably dibasic, carboxylic acids may be used in this invention. Instead of the free polycarboxylic acids, the corresponding polycarboxylic acid anhydrides or corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, diethylterphthalate and bisglycol terephthalate. Any suitable polyhydric alcohol may be used such as, for example, ethylene glycpropylene-1-2 and -1,3-glycol; butylene-1,4- and -2,3-glycol; propylene-1,2 and 1,3-glycol; butylene-1,4-and -2,3-glycol; hexane-1,6-diol; octane-1,8-diol; neopentyl glycol; cyclohexanedimethenol-1(1,4-blshydroxy-methyl-cyclohexane); 2 methylpropane-1,3-diol; glycerol: trimethylol propane; pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as -caprolactone, or hydroxycarboxylic acid such as hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenyl propane, aniline, ammonia, ethanolamine or ethylenediamine; sucrose polyethers such as those described, e.g., in German Auslegeschriften Nos. 1,175,358 and 1,064,938, may also be used according to the invention. It is frequently preferred to use polyethers which contain predominantly primary OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation of thiodiglycol with itself and/or with other glycols, dicarboxylic acids, formaldehyde, aminocarboxylic acids or amino alcohols. The products obtained are polythiomixed ethers or polythioether ester amides, depending on the co-component.

The polyacetals used may be, for example, the compounds which may be obtained from glycols, 4,4'-dihydroxydiphenyl-methylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1, 3-diol; butane-1, 4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with urea-formaldehyde resins are also suitable for the purpose of the invention.

Examples of these compounds which are to be used according to the invention have been described in High Polymers, Volume XVI, "Polyurethane, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Kunststoff-Handbuch, Volume VII, Vieweg-Hochtlen, Carl-Hanser-Verlag, Munich, 1966 on pages 45 to 71.

Any suitable compound which contains one or more active hydrogens may be used in this invention such as alcohols, thioalcohols, phenols, thiophenols, aldehydes, carboxylic acid bromides, sulphonic acid chlorides, organic esters, ethers, thioethers, halomethyl compounds, ketones, nitriles, sulphonic acids, amines and mixtures thereof. Compounds which contain one OH group and/or at least one other hydrophilic and/or polar group which has the general formulae:

RSH, $RCH_2CL$, RCHBr, $RCH_2I$, RCN, $RNO_2$, RCOCL, RCOBr, $RSO_2CL$, RCOOH, $RS_3OH$, RCOO, $RSO_3$, ROR,

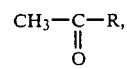

wherein R denotes a methyl, ethyl or propyl group, may be used in this invention.

Component C

Any suitable acidic boron compound may be used in this invention. Suitable acidic boron compounds include, but are not limited to orthoboric acid, metaboric acid, tetraboric acid, boric oxide plus water, boron halides plus water and mixtures thereof. Boric acid powder is the preferred acidic boron compound.

Component D

Any suitable epoxy catalyst may be utilized in this invention. Suitable epoxy catalyst include both Lewis acids and Lewis bases. The Lewis acids are preferred. Many of the acidic boron compounds such as the boron halides are epoxy catalysts. Many of the compounds containing 1 or more reactive hydrogens are epoxy catalyst: $BF_3$ is well known and frequently used as the epoxy catalyst and is the preferred Lewis catalyst.

Acidic salt-forming compounds that contain phosphorus are epoxy catalyst and also enhance the flame-retardant properties. Any suitable phosphorus-containing compound may be used in this invention. Phosphorus-containing compounds include, but are not limited to phosphoric acid, phosphinic acid, phosphinous acid, phosphine oxide, phosphorus trichloride, alkylchlorophosphines, organic acid phosphates, phosphorus oxychloride, monoaluminum phosphate, hydrogen-containing salts of phosphoric acid, hypophosphoric acid, etc. and mixtures thereof. Phosphoric acid is the preferred phosphorus containing compound.

The epoxy catalysts are commonly known in the Art and a list my be found in U.S. Patent Nos. 4,383,089, columns 5–12 and 4,377,646 columns 5–8 and are incorporated into this application. A Lewis acid is any electronacceptor relative to other reagents present in the system. A Lewis acid will tend to accept a pair of electrons furnished by an electron donor (or Lewis base) in the process of forming a chemical compound. A "Lewis acid" is defined for the purpose of this invention as any electron accepting material relative to the polymer to which it is complexed.

Component E

Any suitable basic compound that will adjust the pH to above 7 may be used in this invention. Suitable compounds include alkali metal compounds, alkaline earth metal compounds metal compounds, ammonium compounds and mixtures thereof. These compounds are preferable in a fine powder form. An excess amount of these compounds may be used and utilized as a reactant and filler. It is preferable to use nature mineral products when available, to reduce the cost. Salts of acids stronger than boric acid such as salts of mineral acids are not suitable.

Suitable alkali metal compounds include compounds which contain sodium, potassium, lithium, rubidium and cesium. These compounds may be in the form of alkali metal, oxides, hydroxide, carbonates, salts of organic acids, bicarbonates, natural minerals, silicates, etc.

Suitable alkaline earth metal compounds and mixtures thereof include compounds which contain calcium, strontium, magnesium and barium. These compounds may be in the form of alkaline earth metal, oxides, hydroxides, carbonates, salts of organic acids, silicates, etc., and mixtures thereof.

Suitable metal compounds include compounds which contain beryllium, copper, zinc, titanium, zirconium, lead, arsenic, antimony, bismuth, molybdenum, tungsten, manganese, iron, nickel and cobalt. Suitable metal compounds include, but are not limited to, metals, oxides, hydroxides, carbonates, salts of organic acids, natural minerals, silicates, etc., and mixtures thereof.

Suitable ammonium compounds include, but are not limited to, compounds which contain ammonium radical, such as ammonia, amino compounds, e.g., urea, alkylureas, dicyandiamide, melamine, guanidine, aminoguanidine; amines, e.g., aliphatic amines, aromatic amine; organic ammonium salts, e.g., ammonium carbonate, quaternary ammonium hydroxide, ammonium silicate, and mixtures thereof. Ammonium compounds are the preferred salt-forming compound. It is also preferable to mix the ammonium compounds with other basic salt-forming compounds.

DETAILED DESCRIPTION OF THE INVENTION

The reactions of this invention may take place under any suitable physical conditions, while most of the reactions will take place at ambient pressure, in certain cases, a pressure either lower than or above ambient pressure may give better results. When the reactant is a gas elevated pressure is used. The reactions are exothermic and in some cases cooling of the reactive mixture is required. It may be preferable in certain cases to use a temperature above the organic epoxide compound's boiling temperature after a partial reaction has taken place in order to speed up the chemical reaction. The temperature usually ranges between the boiling temperature of the epoxide compound and 250° C., when the organic epoxide compound is a gas, elevated pressure is used. The components may be mixed in any suitable order, usually simultaneous mixing of the Components A, B, C and D being preferred. The acidic boron compound may be reacted first with the starting compound (Component B) wherein up to 50% of the reactive hydrogens are reacted with the acidic boron compound, then the epoxy compound is added and reacted. A portion of the epoxy compound may be first reacted with the starting compound (Component B) and with itself then acidic boron powder is added and then the remaining epoxy compound is added and reacted. The epoxy compound (Component A) and starting compound (Component B) may be added and reacted first to produce a polyol then the acidic boron compound (Component C) is added and reacted to up to 70% of the active hydrogens present on the polyol molecules and the boron acid radical present on the polyol may be further reacted with Component B.

Alkylene oxides may be polymerized each with itself, e.g. in the presence of BF$_3$, to produce polyether polyols which will react with acidic boron compound but it is preferred to use a starting component which contains reactive hydrogen atoms.

When flame-retardant polyester polyols are desired a saturated or unsaturated polycarboxyl acid and/or polycarboxyl anhydride may be added with Components A, B and C. Any suitable polycarboxyl acid and/or polycarboxyl anhydride may be used. Suitable polycarboxylic acids and polycarboxylic anhydrides included, but not limited to, are listed in Component B.

The unsaturated flame-retardant polyester polyols may be further reacted with vinyl monomers in the presence of an initiator. The vinyl monomer may be added in an amount up to 50% by weight, percentage based on the unsaturated flame-retardant polyester polyol. Any suitable free-radical initiator such as a peroxide initiator may be used in a catalytic amount, usually an amount of 0.2% to 0.5% by weight based on weight of the unsaturated flame retardant polyester polyol. Any suitable peroxide activator may be used to activate the peroxide initiator, in the amount of 30 to 100 ppm.

Component F

Any suitable organic compound containing at least 2 isocyanate radicals may be used in this invention. Suitable organic polyisocyanates may be alphatic, cycloaliphatic, aralphatic, aromatic and heterocyclic polyisocyanates are well known in the arts. Suitable polyisocyanates which may be employed in the process of the invention are exemplified by the organic diisocyanate which are compounds of the general formula:

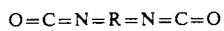

$$O=C=N=R=N=C=O$$

wherein R is a divalent organic radical such as an alkylene, aralkylene or arylene radical. Such radicals may contain, for example 2 to 20 carbon atoms. Other polyisocyanates, polyisothioxyanates, fatty diisocyanates, and their derivatives may be equally employed. Inorganic and silicon polyisocyanate are also suitable according to the invention. Examples of useful polyisocyanate may be found listed in U.S. Pat. No. 4,296,211, page 4–6, in High Polymers, Volume XVI, "Polyurethane Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199 and are incorporated herein by reference.

It's generally preferred to use commercially readily available polyisocyanate, e.g., tolylene-2,4 and -2,6 diisocyanates and any mixtures of these isomers ("TDI") Polyphenyl-polymethylene-isocyanates obtained by aniline-formaldehyde condensation followed by phosgenation and modified polyisocyanates. The preferred compound with at least two isocyanate radicals are polyphenyl-polymethylene-isocyanates obtained by aniline-formaldehyde condensation followed by phosgenation.

Any suitable compound which contains 1 or more isocyanate radicals and one or more unsaturated bonds which will polymerize may be used in this Invention. The unsaturated oliphatic isocyanates which has double-bond vinyl functionality in the same molecule are preferred. Hydroxyethyl methacrylate may be reacted with tolylene diisocyanate or with NCO-terminated prepolymer to produce compound with vinyl functionality and isocyanate functionality in the same molecule.

The double-bond vinyl radical may be cured with free-radical initiators such as an organic hydroperoxide. The isocyanate radical may be cured and foamed with a compound containing attached water.

The flame-retardant polyurethane products may be produced under any suitable physical condition. The components may be mixed in any suitable physical condition. The components may be mixed in any suitable manner. They may be mixed simultaneously. It is preferable to mix and react Components A, B, C, D and E to produce a flame-retardant polyol first then mix in the organic polyisocyanate. The optional component may be added to the mixture of A, B and C or to the flame-retardant polyol. Optional components include, water, initiator, filler, diluent, blowing agent, emulsifying agent, activator, foam stabilizer, modifying compounds, etc. It is preferred to first produce the flame-retardant polyol then mix and react the polyol with an organic polyisocyanate.

The proportions of the reactants and other compounds used in this invention may vary within the following ratios:

a) 50 to 200 parts by weight of Component A;
b) Up to 100 parts by weight of Component B;
c) 1 to 200 parts by weight of Component C;
d) 10 to 100 parts by weight of Component D;
e) Up to 50 percent by weight of an inert liquid, boiling in the range of $-25°$ C. to $80°$ C.;
f) Up to 10 percent by weight of activator(polyurethane catalyst);
g) Up to 20 percent by weight of foam stabilizer;
h) Up to 20 percent by weight of emulsifying agent;
i) Up to 300 percent by weight of inorganic or organic particulate or pulverulent material;
j) Up to 300 percent of a modifying compound;
k) Up to 10 parts by weight of water
l) Up to 25 percent by weight of phase-change material;
m) Up to 5 percent by weight of a free-radical-initiator;
n) 25 to 300 parts by weight of an organic polyisocyanate;
o) up to 300 parts by weight of Component E;
p) up to 200 parts by weight of polycarboxylic acid and/or polycarboxylic anhydride.

Percentages are based on weight of the reaction mixture.

When producing foams by the process according to the invention, blowing agents may be used, even when using NCO-prepolymers which give rise to the evolution of carbon dioxide. The blowing agents which are suitable for this purpose are inert liquids boiling within a range of $-25°$ C. to $+80°$ C. and preferably $-15°$ C. to $+40°$ C. They are used in quantities of 0–50 percent by weight, preferably 2–30 percent by weight when needed, based on the reaction mixture.

Suitable organic blowing agents are, e.g., acetone, ethyl acetate, methanol, ethanol, halogen-substituted alkanes such as methylene chloride, chloroform, ethylidene chloride, vinylidene chloride, monofluorotrichloromethane, chlorodifluoromethane or dichlorodifluoromethane, butane, hexane, heptane or diethyl ether. Substances which decompose at temperatures above room temperature to liberate gases such as azoisobutyric acid nitrile, may also act as blowing agents. Other examples of blowing agents and details concerning the use of blowing agents are described in Kunststoff-Handbuch, Volume VII, published by Vieweg and Hochtlen, Carl-Hanser-Verlag, Munich 1966, e.g., on pages 108 and 109, 453 to 455 and 507 to 510.

Catalysts which promote the reaction of isocyanates with reactive hydrogen are also often used according to the invention in catalytic amounts. Catalysts known per se may be used, e.g., tertiary amines such as triethylamine, tributylamine, N-methyl-morpho-line, N-ethylmorphonine, N-cocomorpholine, N,N,N',N'-tetramethylethylene diamine, 1,4-diaza-bicyclo(2,2,2) octane, N-methyl-N'-dimethylaminoethyl piperazine, N,N dimethyl benzylamine, bis (N,N-diethylamino-ethyl)-adipate, N,N-dimethyl cyclohexylamine, N,N,N',N'-tetramethyl-1,3-butane diamine, N,N-dimethyl-B-phenyl ethylamine, 1,2-dimethyl imidazole or 2-methyl imidazole.

Suitable tertiary amine catalysts with hydrogen atoms which are reactive with isocyanate groups include, e.g., triethanolamine, triisopropanolamine, N methyl-diethanol-amine, N-ethyl-diethanolamine, N,N-dimethyl-ethanolamine and their reaction products with alkylene oxides such as propylene oxide and/or ethylene oxide.

Silaamines which have carbon-silicon bonds as described, e.g., in German Patent Specification No. 1,229,290 may also be used as catalysts, e.g., 2,2,4-trimethyl-2-silamorpholine or 1,3-diethylaminomethyltetramethyl-disiloxane.

Bases which contain nitrogen, such as tetraalkyl ammonium hydroxides, alkali metal hydroxides such as sodium hydroxide, alkali metal phenolate such as sodium phenolate or alkali metal alcoholates such as sodium methylate may also be used as catalysts. Hexahydrotriazines are also suitable catalysts. These amines and other basic catalyst may also be used to adjust the pH to above 7.

Organic metal compounds may also be used as catalysts according to the invention, particularly organic tin compounds.

The organic tin compounds used are preferably tin-(II) salts of carboxylic acids such as tin(II)-acetate, tin(II)-octoate, tin(II)-ethyl hexoate and tin(II)-laureate and the dialkyl tin salts of carboxylic acids such as dibutyl tin diacetate, dibutyl tin dilaurate, dibutyl tin maleate or dioctyl tin diacetate.

Other representatives of catalysts which may be used according to the invention and details concerning the action of the catalysts have been described in Kunststoff-Handbuch, Volume VII, published by Vieweg and Hochtlen, Carl-Hanser-Verlag, Munich, 1966, e.g., on pages 96 to 102.

The polyurethane catalysts or activators are generally used in any catalytic amount, preferably in a quantity up to 10 percent by weight, based on the reactive mixture.

A surface-active additive (emulsifiers and foam stabilizers) may be added to the components. Any suitable surface-active additive may be used. The surface-active additive may be non-ionic, anionic or cation. Suitable surface-active additive include, but not limited to, the sodium salts of ricinoleic sulphonates or of fatty acids or salts of fatty acid with amines, e.g., oleic acid diethylamine or stearic acid diethanolamine, alkali metal or ammonium salts of sulphonic acid, e.g., dodecylbenzene sulphonic acid or dinaphthyl methane disulphonic acid, or fatty acids such as ricinoleic acid, or polymeric fatty acids and others. The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308.

Solid inert fillers may be added to the components. They may be organic or inorganic substances and may be in the form of powders, hollow beads, granulate, wire, fibers, dumb bells, crystallites, spirals, rods, beads, foam particles, webs, woven fabric, ribbons, etc. Any commonly known inert filler known in the Arts may be used.

Any suitable initiator which will promote the polymerization of a solution of a vinyl monomer may be used in this invention. The controlled polymerization of the vinyl monomer in a polyol, in order to yield fully cured solids, usually required the use of an initiator. Only a catalytic amount of an initiator is needed and the amount may vary up to 1% by weight based on the vinyl monomer.

Any suitable free-radical initiator, such as organic and inorganic peroxides, azo compounds, alkali metal persulfates, ammonium persulfates and mixtures thereof, may be used. The fact that the action of organic peroxide can be modified by activators and promoters, plus their ready availability at reasonable cost, makes them preferably in this invention. Thermal and photo-polymerization may be used in certain cases.

Suitable organic peroxide initiators include, but are not limited to, acetyl benzoyl peroxide, methyl ethyl ketone peroxide, cyclohexanone peroxide, cyclohexyl hydroperoxide, 2,4 dichlorobenzyl peroxide, cumene hydroperoxide, tert-butyl hypoperoxide, methyl amyl ketone peroxide, lauryl peroxide, benzoyl peroxide, tert-butyl perbenzoate, di-tert-butyl diperphthalate, and mixtures thereof.

Activators and promoters, used in conjunction with the initiators such as cobalt which, in the form of its ethyl hexanoate or naphthanate salt, is a good, general-purpose activator for use with ketone peroxides, may be added to the vinyl monomer. Concentration as low as 30 ppm of cobalt metal will activate a system.

Other activators may be added to the vinyl monomers such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

Promoters used with acyl perioxde include tertiary dialkyl aryl amines such as diethyl aniline and aliphatic thiols, such as, for example, lauryl mercaptan. Concentrations used are most often in the range of up to 0.5% of active substances. Promoters usually are strong reducing agents and initiators are strong oxidizing agents Suitable alkali metal persulfates include potassium and sodium persulfate. Redox system's may also be utilized in this invention.

Epoxy catalyst may be used with the epoxy compounds. Suitable epoxy catalyst include amines, Lewis acids, alkali metal oxides and hydroxides and mercaptan-terminated liquid compounds. A list of these compounds may be found in U.S. Pat. No. 4,383,089 pages 5-12 and is incorporated into this Application.

Any suitable modifying or additive compound may be used in the reaction of this invention to vary properties of the product. Typical modifying compounds include polyepoxides, polysulfides, polymers, alkali sulfides, aminoplasts, phenoplasts, fatty or rosin acids, furfural ketone resin, styrene oxide, cellulose, lignin, vegetable oil, melamine, urea, furan compounds, vinyl monomers with catalyst, vinyl polymers, aliphatic dienes, diene polymers, halogenated aliphatic and aromatic compounds, triallyl cyanurate, polyepichlorohydrin polymers, alkali metal phenols, polyester resins with catalyst, aldehydes, ketones, alkali metal silicates, aqueous alkali metal silicates, fumed silica, hydrated silica, polysilicic acid, perchloroethylene, benzoate esters, phthalate esters, polyester benzoate, water-binding agents, etc. and mixtures thereof.

Any suitable phase-change materials may be added to the components of this invention. Phase-change materials are materials that melt to store heat and freeze (solidify) to give up heat. The melting and freezing of the material takes place over a narrow temperature range, similar to ice. Heat is stored during the day and released at night when temperature drops. Suitable phase-change materials include, but are not limited to, salt hydrates, crystalline alkyl hydrocarbons (paraffin waxes), fatty acids, fatty acid esters, poly (ethylene glycol) waxed and mixtures thereof. Flame retard ants may be added to change the melting and freezing points. The various phase-change materials may be mixed to obtain the desired melting and freezing points.

Any suitable flame-retardant agent may be used in this invention such as alkali metal phosphate compounds, alkaline metal earth phosphate compounds, ammonium phosphates and other salts of phosphoric acid, halogenated paraffins, organic phosphorus containing compounds, organic phosphorus and halogen containing compound and other flame-retardant agents commonly known in the Arts. Other substances such as plasticizers, dyes, stabilizers, negative catalyst, pigments, stabilizers against aging and weathering, fungicidal and bacteriocidal substances may be used in this invention. Details about methods of using these additives and their action may be found in Kunststoff-Handbuch, Volume VI; published by Vieweg and Hochtlen, Carl-Hansen-Verlag, Munich 1966, e.g. on pages 103 to 113.

Polyurethane products have many uses and these uses are well known in the Arts. The polyurethane foam produced by this invention may be used for cushioning, packaging, sound and thermal insulation, as an adhesive, as construction material, as shoe soles, as coating agent, as cavity filler, etc.

The reactive components may be mixed and sprayed in any of the well known polyurethane foaming machines to produce in-situ insulation. The components may be used in a two component system, mixed then poured in place such as in boats for flotation. The mixed components may be pumped into molds to form auto or furniture cushions, art objects, building materials, insulation, paneling, etc.

The object of the present invention is to provide a novel process of producing inorganic-organic flame-retardant polyols. Another object is to produce inorganic-organic flame-retardant polyols. Another object is to produce novel flame-retardant polyurethane products. Another object is to produce novel flame retardant polyurethane products using small amounts of low cost flame-retardant agents. Still another object is to produce flame-retardant polyurethane products that may be used for thermal insulation, structural purposes, sound proofing, shock-resistant packaging, cushions, surface coating, adhesives, casting material, putty, etc. Still another object is to produce inorganic-organic flame-retardant polyester polyols and resins.

DESCRIPTION OF PREFERRED EMBODIMENTS

My invention will be illustrated in greater detail by the specific examples which follow, it being understood that theses preferred embodiments are illustrative of, but not limited to, procedures which may be used in the production of flame-retardant polyurethane products. Parts and percentages are by weight unless otherwise indicated.

Example 1

About 100 parts by weight of propylene oxide, 2.5 parts by weight of dextrose powder, 20 parts by weight of boric acid powder then 100 parts by weight of 75% phosphoric acid is slowly added while agitating. The reaction vessel is water cooled and the propylene oxide lost by evaporation is replaced. The chemical reaction is complete in 1 to 8 hours thereby producing a flame-retardant polyol.

Example 2

Example 1 is modified wherein the dextrose is replaced with another compound selected from the list below:
 a) lactose
 b) sucrose
 c) fructose
 d) ethylene glycol
 e) propylene glycol
 f) diethylene glycol
 g) dipropylene glycol
 h) glycerol
 i) butylene glycol
 j) water
 k) ethyl alcohol
 l) trimethylol propane
 m) trimethyolethane
 n) pentaerythritol
 o) mannitol
 p) sorbitol
 q) methyl glycoside
 r) aniline
 s) 4,4'-dihydroxy-diphenyl propane
 t) ethanolamine
 u) methanol
 v) hexane 1,2,6-triol
 w) 2 methyl-1,3-propanidiol
 x) butane 1,2,4-triol
 y) quinitol
 z) mixtures of the above

Example 3

Example 1 is modified wherein a catalytic amount of boron trifluoride is added with the phosphoric acid.

Example 4

Example 1 is modified wherein about 25% of the propylene oxide is replaced with another epoxy compound selected below and a catalytic amount of boron trifluoride is added:
 a) ethylene oxide added under pressure and in a closed vessel
 b) epichlorohydrin
 c) butylene oxide
 d) trichlorobutylene oxide
 e) tetrahydrofuran
 f) styrene oxide
 g) methyl epichlorohydrin
 h) epibromohydrin
 i) vinyl cyclohexane dioxide
 j) 3-4-epoxycyclohexylmethyl-3,4-epoxycyclohexane
 k) 2,3-epoxybutyl
 l) di(2,3-epoxybutyl) adipate
 m) epoxidized soy bean oil

Example 5

Example 1 is modified wherein a catalytic amount of boron trichloride is used in place of the phosphoric acid.

Example 6

Example 1 is modified wherein a catalytic amount of a metal halide is added with the phosphoric acid and selected from the list below:
 a) aluminum chloride
 b) zinc chloride
 c) ferric chloride
 d) tin tetrachloride
 e) antimony pentachloride
 f) magnesium chloride
 g) magnesium bromide
 h) calcium bromide
 i) trontium bromide
 j) Chromic bromide
 k) boron trichloride
 l) manganous chloride
 m) cobaltic chloride
 n) cupric bromide
 o) ceric chloride
 p) thorium chloride
 q) arsenic trichloride
 r) calcium iodide
 s) arsenic tri iodide
 t) boron trifluoride
 u) mixtures of the above.

Example 6

Example 1 is modified wherein 25 parts by weight of a polycarboxylic acid and/or polycarboxylic anhydride is added with Components A, B, C and D and selected from the list below:
 a) phthalic anhydride
 b) maleic anhydride
 c) adipic acid
 d) succinic acid
 e) sebacic acid
 f) suberic acid
 g) trimellitic acid
 h) fumaric acid
 i) maleic acid
 j) tetrahydrophthalic anhydride
 k) glutaric anhydride
 l) azelaic acid
 m) iosophthalic acid
 n) oleic acid
 o) itaconic acid After the initial reaction is complete the temperature is slowly increased to 250° C. while agitating for a period ranging from 30 minutes to 4 hours, thereby producing a flame-retardant polyester polyol.

Example 7

Example 6 is modified by adding an additional step wherein the unsaturated flame-retardant polyester is dissolved in a vinyl monomer selected from the list below then a catalytic amount of methyl ethyl ketone peroxide and cobalt naphthenate is added and thoroughly mixed. The mixtures solidifies in 30 minutes to 4 hours to form a solid flame-retardant polyester resin:
a) styrene
b) vinyl acetate
c) acrylic acid
d) methylacrylic acid
e) methyl methylacrylate
f) vinyl toluene
g) divinyl benzene
h) acrylonitrile
i) methacrylonitrile
j) mixtures of the above Other radical initiators may be used with or in place of methyl ehtyl ketone peroxide such as benzyl peroxide with diethyl aniline, cyclohexanone peroxide, cumene hypoperoxide, lauroyl peroxide, etc.

Example 8

Example 1 is modified wherein an organic polyisocyanate selected from the list below is added with Components A, B, C and D thereby producing a rigid flame-retardant polyurethane foam:
a) polymeric MDI (MONDUR MR by MOBAY)
b) polymeric MDI (PAPI 27 by DOW)
c) tolylene diisocyanate (TDI 80 by MOBAY)
d) polyphenyl polymethyl polyisocyanate
e) hexylene-1,6 diisocyanate

Example 9

About 100 parts by weight of propylene oxide, 0.5 parts by weight of BFS, 10 parts by weight of 85% phosphoric acid (15% water), 20 parts by weight of glycerol, 20 parts by weight of boric acid powder, is added to a water cooled autoclave with an agitator and large enough to allow expansion, at room temperature then 20 parts by weight of ethylene oxide are added under pressure wherein the ethylene oxide is added in a liquid form while agitating and cooling the autoclave. Most of the reaction takes place in a few minutes and is complete in 1 to 8 hours thereby producing a liquid flame-retardant polyol.

Example 10

About 100 parts by weight of epichlorohydrin, 10 parts by, weight of phosphoric acid containing 25% water, 20 parts by weight of boric acid are mixed in a water cooled container and agitated, the reaction is complete in 1 to 8 hours thereby producing a liquid flame-retardant polyol.

Example 11

Example 9 is modified wherein the phosphoric acid is left out.

Example 12

Example 10 is modified wherein the phosphoric acid is replaced with 0.5 parts by weight of BF$_3$.

Example 13

About 30 parts by weight of the poly ethylene/propylene borate triol produced in example 12, 5 parts by weight of hydrated sodium silicate (SiO$_2$:Na$_2$O ratio of 3.25:1, containing 25% water;, 0.2 parts by weight of tin octoate, 0.3 parts by weight of an amine polyurethane catalyst (DABCO R8020 by AIR PRODUCTS), are mixed then 15 parts by weight of tolylene diisocyanate (TDI 80 by MOBAY) are added and thoroughly mixed. The mixture expands to produce a flexible flame-retardant polyurethane foam of about 1.5 lbs./cu. ft.

Example 14

Example 13 is modified wherein another basic salt forming compound selected from the list below replaces the 5 parts by weight of sodium silicate:
a) 1 part by weight of ethanolamine
b) 5 parts by weight of hydrated alumina
c) 5 parts by weight of calcium carbonate
d) 1 part by weight of calcium oxide
e) 2 parts by weight of urea
f) 3 parts by weight of melamine
g) 3 parts by weight of ammonium silicate
h) 2 parts by weight of white Portland cement
i) 2 parts by weight of zinic hydroxide
j) 2 parts by weight of sodium carbonate
k) 2 parts by weight of calcium hydroxide
l) 3 parts by weight of ammonia carbonate

Example 15

Example 13 is modified wherein the 15 parts by weight of tolylene diisocyanate is replaced with 20 parts by weight of polymeric MDI (MONDUR MR by MOBAY).

Example 16

About 30 parts by weight of polymeric MDI (MONDUR MR by MOBAY) are mixed with a mixture of 0.2 parts by weight of a foam stabilizer (L5420 by UNION CARBIDE), 0.2 parts by weight of tin octoate, 1 part by weight of ethanolamine and 35 parts by weight of flame retardant polyol selected from the example list below, thereby producing a rigid flame-retardant polyurethane foam of about 1.8 to 3 lbs./cu. ft. The foams were flame tested with a propane torch with a 1 inch long flame and held about 1 inch from the foam for 15 seconds. The foam self extinguished after charring.
a) 1
b) 2a
c) 2b
d) 2c
e) 2n
f) 2-o
g) 2p
h) 2q
i) 2r
j) 2s
k) 3
l) 4b
m) 5
n) 5
o) 6a
p) 6c
q) 7a while in a liquid state
r) 10
s) 12

Example 17

Example 16 is modified wherein about 5 parts by weight of liquid phase-change material, a mixture of paraffin waxes with a freezing (solidifying) point of about 70° F. and a melting point of about 72° F. is added to the flame-retardant polyol.

Example 18

Tolylene diisocyanate is reacted with hydroxyethyl methacrylate to produce a NCO-terminated prepolymer, then 60 parts by weight of the prepolymer is mixed with 20 parts by weight of the flame-retardant polyol produced in example 1 containing 0.5 parts by weight of triethylamine, 0.2 parts by weight of tin octoate and a catalytic amount of organic hyproperoxide. The mixture cures into a flame-retardant microcellular foam.

Example 19

Example 16 is modified wherein about 10 parts by weight of a polyol selected from the list below is used in place of parts by weight of the flame retardant polyol:
a) polypropylene triol, mol. wt. 3,000, hydroxyl no. 56
b) polypropylene triol, hydroxyl no. 620, viscosity 750
c) ethylene oxide/propylene oxide polyol viscosity 857, hydroxyl no. 335
d) phosphorus containing polyol (VIRCOL-82 by MOBIL), hydroxyl no. 205
e) amine polyol, hydroxyl no. 475
f) sorbitol-based polyol, hydroxyl no. 490
g) aromatic polyester polyol, hydroxyl no. 405
h) sucrose amine polyol, hydroxyl no. 413
i) sucrose polyether polyol, hydroxyl no. 380
j) polypropylene polyol with urea, hydroxyl no. 380
k) mixtures of the above.

I claim:

1. The process for the production of inorganic-organic flame-retardant polyol which process comprises of mixing and reacting the following Components:
   A. epoxy compound, in the amount of 50 to 200 parts by weight;
   B. compound containing 1 oz more reactive hydrogens that will react with an epoxy compound, in the amount of up to 100 parts by weight;
   C. acidic boron compound in the amount of 10 to 100 parts by weight;
   D. epoxy catalyst, in a catalytic amount up to 20 parts by weight;
   E. basic salt forming compound in an amount up to 300 parts by weight;
Component E is added and reacted after Components A, B, C and D have been added and reacted.

2. The product produced by the process of claim 1.

3. The process of claim 1 wherein the epoxy compound is selected from the group consisting of ethylene oxide, propylene oxide, styrene oxide, butylene oxide, tetrahydrofuran, polyepoxy compounds, epihalohydrins and mixtures thereof.

4. The process of claim 1 wherein the acidic boron compound is boric acid.

5. The process of claim 1 wherein the epoxy catalyst is a Lewis acid.

6. The process of claim 1 wherein the basic salt forming compound is selected from the group consisting of alkali metal compounds selected from the group consisting of compounds containing sodium potassium, lithium, rubidium, cesium and mixtures thereof, except for alkali, metal salts of mineral acids; alkaline earth metal compounds selected from the group consisting of compounds containing calcium magnesium, barium, strontum and mixtures thereof, except for alkaline earth metal salts of mineral acids; metal compounds selected from the group consisting of compounds containing beryllium, copper, zinc, aluminum, tin, titanium, zirconium, lead, arsenic, antimony, bismuth, molybdenum, tungsten, manganese, iron, nickel, cobalt and mixtures thereof, except for metal salts of mineral acids; ammonia compounds selected from the group consisting of ammonia, ammonium carbonate, amino compounds, amines, ammonia salts of organic acid, quaternary ammonium hydroxides, ammonium silicate, polyamides, alcohol amines and mixtures thereof except for ammonium salts of mineral acids and mixtures thereof.

7. The process of claim 1 wherein up to 200 parts by weight of a polycarboxylic acid and/or polycarboxylic anhydride is added with Components A, B or C.

8. The product produced by the process of claim 7.

9. The product produced by mixing and reacting the following compounds:
   A. epoxy compound, in the amount of 50 to 200 parts by weight;
   B. organic polyhydroxy compound, in the amount of up to 100 parts by weight;
   C. boric acid, in the amount of 10 to 100 parts by weight;
   D. Lewis acid, selected from the group consisting of organic carboxylic acids, organic anhydrides, quinones, ketones, organic sulphonic acids, hydrogen halides, sulfuric acid, and metal halides of metals and metalloids of the group IB, II through to group VIII of the periodical system, in the catalytic amount up to 20 parts by weight.

10. The product produced by mixing and reacting the following compounds:
    A. propylene oxide
    B. compound containing 2 or more reactive hydrogens that will react with an epoxy compound
    C. boric acid
    D. phosphoric acid with boron trifluoride as the epoxy catalyst.

11. The product produced by mixing and reacting the following compounds:
    A. epoxy compound
    B. compound containing 2 or more reactive hydrogens that will react with an epoxy compound
    C. boric acid
    D. Lewis acid
    E. polycarboxylic acid and/or polycarboxylic anhydride.

12. The process of claim 1 wherein an organic polyisocyanate in the amount of 25 to 300 parts by weight is added and reacted with the product produced by the process of claim 1 by reacting Components A, B, C, D and E.

13. The product produced by the process of claim 12.

14. The process of claim 12 wherein up to 20% by weight of a foam stabilizer is added to the product produced by reacting Components A, B, C, D and E, percentage based on weight of the reaction mixture.

15. The process of claim 12 wherein up to 10% by weight of an amine polyurethane catalyst is added to the product produced by reacting Components A, B, C, D and E, percentage based on weight of the reaction mixture.

16. The process of claim 12 wherein up to 10% by weight of an organo-metal polyurethane catalyst is added to the product produced by reacting Components A, B, C, D and E, percentage based on weight of the reactive mixture.

17. The process of claim 12 wherein up to 50% by weight of a polyurethane blowing agent is added to the product produced by reacting Components A, B, C, D and E, percentage based on weight of the reactive mixture.

18. The process of claim 1 wherein up to 20% by weight of an emulsifier is added to Component E, percentage based on weight of Components A, B, C, D and E.

19. The product produced by mixing and reacting the following Components:
   A. epoxy compound, in the amount of 50 to 200 parts by weight;
   B. compound containing 2 or more reactive hydrogens that will react with an epoxy compound, in the amount of up to 100 parts by weight;
   C. boric acid
   D. Lewis acid, selected from the group consisting of organic carboxylic acids, organic anhydrides, quinones, ketones, organic sulphonic acids, hydrogen halides, sulfuric acid and metal halides of metals and metalloids of he group I B, II through to group VIII of the periodical system, in a catalytic amount up to 20 parts by weight;
   E. basic salt forming compound, in the amount up to 300 parts by weight;
   F. organic polyisocyanate, in the amount of 25 to 300 parts by weight;
   G. polyurethane blowing agent, in the amount up to 20 percent by weight base don weight of the reactants;
   H. foam stabilizer, in the amount up to 20 percent by weight based on weight of the reactants;
   I. amine polyurethane catalyst, in the amount of up to 10 percent by weight based on weight of reactants;
   J. organo-metal polyurethane catalyst, in the amount of up to 10 percent by weight base don weight of reactants;
Components A, B, C and D are mixed first and reacted, then Component E is added and reacted the Components F, G, H, I and J are added and reacted thereby producing a flame-retardant polyurethane foam.

20. The product produced by mixing and reacting the following components:
   A. propylene oxide
   B. compound containing 2 or more reactive hydrogens that will react with an epoxy compound
   C. boric acid
   D. Lewis acid, selected from the group consisting of organic carboxylic acids, organic anhydrides, quinones, ketones, organic sulphonic acids, hydrogen halides, sulfuric acid and metal halides of the metals and metalloids of the groups I B, II through to group VIII of the periodical system;
   E. basic salt forming compound
   F. polycarboxylic anhydride
   G. organic polyisocyanate
   H. polyurethane blowing agent
   I. amine polyurethane catalyst
   J. organo-metal urethane catalyst
   K. foam stabilizer
Components A, B, C, D and F are mixed and reacted then Component E is added and reacted then Components G, H, I, J and K are added and reacted thereby producing a flame-retardant polyurethane foam.

21. The process for the production of inorganic-organic flame-retardant polyols which process comprises of mixing and reacting the following Components:
   A) epoxy compound, in the amount of 50 to 200 parts by weight;
   B) compound containing 1 or more reactive hydrogens that will react with an epoxy compound, in the amount of up to 100 parts by weight;
   C) acidic boron compound, in the amount of 10 to 100 parts by weight;
   D) epoxy catalyst, selected from the group consisting of organic carboxylic acids, organic anhydrides, quinones, ketones, organic sulphonic acids, hydrogen halides, sulfuric acid and metal halides of the metals and metalloids of the group I B, II through to group VIII of the periodical system in a catalytic amount up to 20 parts by weight.

22. The product produced by the process of claim 21.

23. The flame-retardant polyol produced by mixing and reacting the following compounds:
   a) epoxy compound, selected from the group consisting of ethylene oxide, propylene oxide, styrene oxide, butylene oxide, tetrahydrofuran, polyepoxy compounds and mixtures thereof, in the amount of 50 to 200 parts by weight;
   b) acidic boron compound in the amount of 10 to 100 parts by weight;
   c) epoxy catalyst, selected from the group consisting of organic carboxylic acids, organic anhydrides, quinones, ketones, organic sulphonic acid, hydrogen halides, sulfuric acid and metal halides of metals of the group I B, II through to group VIII of the periodical system, in a catalytic amount up to 20 parts by weight.

24. The produce produced by mixing and reacting the following Components:
   a) epoxy compound, in the amount of 50 to 200 parts by weight;
   b) acidic boron compound, consisting of boric acid and boric halides, in the amount of 10 to 100 parts by weight.

* * * * *

UNITED STATES PATENT AND TRADEMARK OFFICE
CERTIFICATE OF CORRECTION

PATENT NO. : 5,034,423

DATED : July 23, 1991

INVENTOR(S) : David H. Blount

It is certified that error appears in the above-identified patent and that said Letters Patent is hereby corrected as shown below:

Column 13, line 32, delete "BFS" and insert --$BF_3$--.

Column 15, line 34, delete "OZ" and insert --OR--.

Signed and Sealed this

Twenty-second Day of October, 1991

Attest:

HARRY F. MANBECK, JR.

Attesting Officer     Commissioner of Patents and Trademarks